United States Patent [19]

Abe et al.

[11] Patent Number: 4,689,150

[45] Date of Patent: Aug. 25, 1987

[54] SEPARATION MEMBRANE AND PROCESS FOR MANUFACTURING THE SAME

[75] Inventors: Fumio Abe; Tadashi Fujita, both of Nagoya, Japan

[73] Assignee: NGK Insulators, Ltd., Japan

[21] Appl. No.: 832,218

[22] Filed: Feb. 24, 1986

[30] Foreign Application Priority Data

| Mar. 7, 1985 | [JP] | Japan | 60-45271 |
| Mar. 13, 1985 | [JP] | Japan | 60-50078 |
| Mar. 13, 1985 | [JP] | Japan | 60-50079 |
| Mar. 13, 1985 | [JP] | Japan | 60-50080 |

[51] Int. Cl.⁴ .................. B01D 25/04; B01D 29/46; B05D 5/00; C23C 16/00
[52] U.S. Cl. .................. 210/490; 210/496; 210/500.26; 210/510.1; 264/42; 427/244; 427/245; 427/255
[58] Field of Search .......... 210/490, 491, 496, 500.26, 210/510; 264/42; 427/244, 245, 255

[56] References Cited

U.S. PATENT DOCUMENTS 4,077,885 3/1978 Heuven et al. ............ 210/500.26

FOREIGN PATENT DOCUMENTS 2549736 2/1985 France ..................... 210/500.26

*Primary Examiner*—Michael R. Lusignan
*Attorney, Agent, or Firm*—Parkhurst & Oliff

[57] ABSTRACT

A separation membrane includes a glassy microporous membrane and a ceramic porous support. The separation membrane has excellent heat resistance, corrosion resistance, durability, gas-separability and high mechanical strength. The separation membrane is preferably provided with a metallic or ceramic microporous membrane vapor-deposited on the surface of the glassy microporous membrane. The separation membrane can be utilized with high efficiency in diversified fields such as microfiltration or ultrafiltration of liquidal or gaseous fluids. A process for manufacturing such a separation membrane is also disclosed.

14 Claims, 9 Drawing Figures

FIG_1
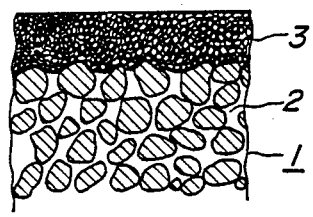
FIG_2
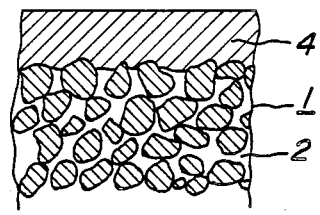
FIG_3
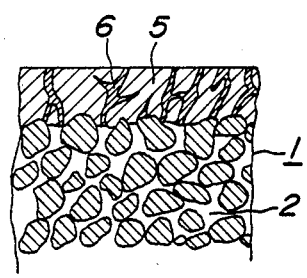
FIG_4
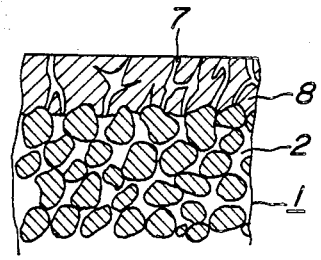

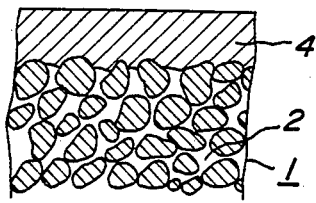
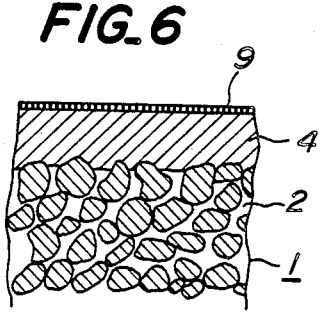
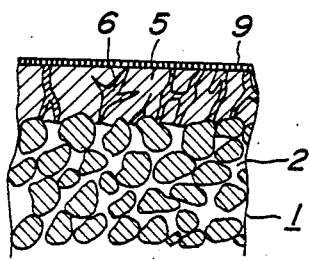
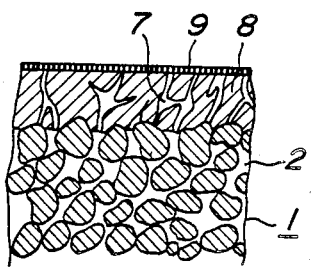
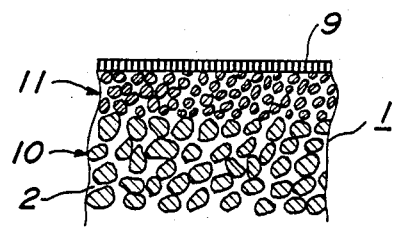

SEPARATION MEMBRANE AND PROCESS FOR MANUFACTURING THE SAME

BACKGROUND OF THE INVENTION

1. Field of the Invention

The present invention relates to a separation membrane to be utilized, beginning with gas-separation, in a wide variety of separation such as microfiltration, ultrafiltration, reverse osmotic separation and the like, and a process for manufacturing the same.

2. Related Art Statement

In a field of gas-separation, etc. where a specific gas is separated from a mixed gas by a gas-diffusion there have been employed separation membranes having micropores with an average pore size of between several tens of Å and several hundreds of Å which is much smaller than the mean free paths of gas molecules. Although organic high polymer membranes, as conventional separation membranes of this kind, have been generally used, they are not employable for temperatures higher than 100° C. and, moreover, are inferior in corrosion resistance and durability, so that various problems still remain in their practical uses.

Further, aiming an improvement of heat resistance, there are known processes for producing porous separation membranes by sintering metallic powders and/or ceramic powders. Separation membranes according to such a process are, however, difficult to form into 1 mm thick or less, due to a question of strength and, therefore, have have a lack of practicability yet, as a separation membrane of gas-separation which is desired to improve its separation efficiency, with decreasing thickness to the possible utmost extent.

An attempt was made, as described in the Gazette of Japanese Patent Application Laid-open No. 59-59,223, to obtain a permeable membrane consisting of a multi-layered porous body, by impregnating a porous body, such as a ceramic sintered body, with a solution of a permeable membrane-forming component, such as aluminum alcoholate, aluminum chelate or the like, hydrolyzing and thereafter drying followed by firing. According to this method, water or an organic binder in the solution is, when transpires, apt to leave cracks and/or foams behind in the permeable membrane, therefore even if the pore size of micropores in the membrane is controlled in the range between several tens of Å and several hundreds of Å, a major part of gas will eventually diffuse through perforations having a pore size of several tens of microns formed by cracks, so that the resulting membrane has such a shortcoming that desired gas-separation is hardly effected.

SUMMARY OF THE INVENTION

The present invention has been accomplished by solving such problems in the prior arts, with the object of obtaining a separation membrane comprising numerous micropores having an average pore size of 10–5,000 Å, being excellent in heat resistance, corrosion resistance and durability and having no fear of forming cracks, etc. therein, even when its thickness is reduced to the utmost.

Another object of the invention is to provide a process for manuacturing such a separation membrane.

A separation membrane according to the present invention is characterized in comprising essentially a glassy porous membrane having substantially reticular micropores with an average pore size of about 10–5,000 Å, obtained by a phase-separation treatment of a glassy membrane, wherein the glassy porous membrane is fixed on the surface of a porous support having substantially continuous micropores.

Further, a process according to the invention for manufacturing the separation membrane is characterized by comprising at least steps in the order of: covering the surface of a porous support having substantially continuous micropores, with a precursor layer for a porous membrane comprising phase-separable glass particles; heating the precursor layer to transform into a glassy membrane as on the surface of the support; subjecting the glassy membrane to a further heat-treatment to separate the glassy phases of the glassy membrane into a silica-rich glassy phase and an alkali-rich glassy phase; and eluting the alkali-rich glassy phase with a solvent for the alkali-rich glassy phase, such as hot water, acids and the like, thereby transforming the phase-separated glassy membrane into a glassy porous membrane having substantially reticular micropores with an average pore size of about 10–5,000 Å.

BRIEF DESCRIPTION OF THE DRAWING

Some embodiments of the invention will now be described by way of example and with reference to the accompanying drawings in which:

FIGS. 1 to 4 are enlarged cross-sectional views of a part of an embodiment of the present invention, schematically illustrating a process of the invention;

FIGS. 5 to 8 are enlarged cross-sectional views of a part of another embodiment of the present invention, also schematically illustrating another process of the invention; and FIG. 9 is an enlarged cross-sectional view of a part of a further different embodiment of the present invention.

DESCRIPTION OF THE PREFERRED EMBODIMENTS

In FIG. 1, porous support 1 comprises substantially continuous micropores 2 having an average pore size of about 0.5μ to about 30μ which will not hinder gas-diffusion. The term "substantially continuous micropores" used in this specification and the appended claims, is to be understood to mean micropores, a majority of which are interconnected to form continuous passages, but some may be isolated.

Although the support applied to the present invention can be composed of any materials excellent in strength and processability, use may be preferably made of a porous body comprising a ceramic, such as alumina, silica, mullite, cordierite and the like, which may have a thermal expansion coefficient approximately the same as that of glass, and also may be made of a glassy porous body such as that obtained by glassy-phase-separation treatment of glass, or a foamed glass. If the average pore size of pore 2 in support 1 is smaller than 0.5μ, resistance for gas-diffusion will excessively increase, while when exceeds its 30μ, there will develop a high possibility of producing pinholes in a glassy membrane formed on the surface of the support. The surface of such support 1 is, in the first place, coated with a precursor layer for a porous membrane comprising phase-separable glass particles.

The glassy separate phase is a glassy phase wherein two or more kinds of separate glassy phases are formed, by utilizing, in general, separation of a silica-rich glassy phase and an alkali-rich glassy phase. Glass systems including the following may be used as a phase-separable glass: $Na_2O—B_2O_3—SiO_2$, $Na_2O—B_2O_3—SiO_2$-heavy metal oxide, $Na_2O—B_2O_3—CeO_2\cdot3Nb_2O_3$, $Na_2O—P_2O_5—SiO_2$, $Na_2O—B_2O_3—SiO_2—GeO_3$, etc. A typical $Na_2O—B_2O_3—SiO_2$ system glass is made to separate, by heat-treatment, its internal homogeneous borosilicate-glassy phase into a silica-glassy phase consisting substantially of $SiO_2$ alone and another glassy phase comprising, as a main component, $Na_2O—B_2O_3$, in the dimensional order of several tens of angstroms, and so it is desirable that a molar ratio of $Na_2O/B_2O_3$ is brought near 1/5 so as to facilitate the glassy-phase-separation and preferable when 50% or more of $SiO_2$ is contained, from the standpoint of strength retention after the elution treatment. Such a phase-separable gas is, according to a conventional process, melted, quenched by introducing into water, crushed, thereafter pulverized in a ball mill, with organic additives added if required, and made into a slip which is then applied onto the surface of support 1, to form a coating, i.e. precursor layer, 10–500μ thick, by discretional means of dipping, brush-coating, spraying, etc. Thus, as is shown in FIG. 1, a precursor layer 3 for porous membrane containing phase-separable glass particles is formed on the support. If the thickness is smaller than 10μ, pinholes are apt to form, while if exceeds it 500μ, the gas-separating effect will be lowered.

In the next place, precursor layer 3 for porous membrane is heated at about 1,000°–1,500° C. to melt again and transform into a homogeneous glassy membrane 4 as shown in FIG. 2. During this heating, the organic additives, if exist, are burned off, yielding a homogeneous glassy membrane 4 such as that of borosilicate-glass. Upon a glassy-phase-separation treatment, separate phases are produced in glassy membrane 4 as shown in FIG. 3, separating into silica-rich glassy phase 5 and alkali-rich glassy phase 6. The glassy-phase-separation treatment is effected generally at about 150°–800° C. for 0.5 hour or more, and in the case where, as a phase-separable glass, an $Na_2O—B_2O_3—SiO_2$ system glass is employed, it will be effected at about 400°–700° C. When the glassy-phase-separation treatment is performed at a relatively low temperature for a short period of time, rather fine separate phases will be produced, and since the higher the temperature and the longer the treating time the further will proceed the glassy-phase-separation, conditions for glassy-phase-separation are determined so that the dimension of a cross-section of alkali-rich glassy phase 6 may be about 10–5,000 Å.

Then, upon an elution-treatment using a solvent for the alkali-rich glassy phase, such as hot water of 90° C. or higher, or 0.01–0.1N hydrochloric acid, sulfuric acid, nitric acid or the like, of 60°–100° C., alkali-rich glassy phase 6 is eluted, whereby glassy porous membrane 8 having substantially reticular micropores 7 with an average pore size of 10–5,000 Å is formed on the surface of support 1, as shown in FIG. 4. The term "substantially reticular micropores" used in this specification and the appended claims, is to be understood to mean a network, whether perfect or not and whether random or not, formed by micropores longitudinally and latitudinally interconnected.

Further, in FIG. 5, on the surface of support 1 is formed a phase-separable homogeneous glassy membrane in the same manner and by the same method as described hereinbefore with respect to FIGS. 1 and 2. On the surface of phase-separable glassy membrane 4, metallic or ceramic membrane 9 can be formed by a gaseous phase method, as shown in FIG. 6.

The gaseous phase method is defined as a method wherein a substance for forming membrane or a substance forming a raw material of membrane is given heat or momentum, thereby decomposing into atoms, molecules and/or clusters thereof which are then combined with or condensed on a substrate separately allocated, which is roughly classified into a chemical vapor deposition method (CVD method) and physical vapor deposition method (PVD method). The CVD method is further classified into a chemical vapor deposition method in a narrow sense, chemical vapor transport method, substrate reaction method, spray method, etc. any of which is a method comprising: transforming a material for forming membrane into a readily vaporizable compound; transporting it through its gaseous phase; and effecting chemical reactions on the surface of a substrate, to deposit a membrane thereupon. On the other hand, the PVD method, such as a vacuum evaporation method, ionic plating method, sputtering method, plasma spray deposition method and the like, is a method comprising: giving energy to a material to evaporate; and depositing the vapor on a substrate to form a membrane thereupon.

If the above-mentioned gaseous phase method is effected by controlling the temperature of the substrate, the surrounding atmospheric pressure, etc. each at an appropriate value, membrane 9 thus deposited on the substrate, i.e. glassy membrane 4, can be provided, by nucleus-development or self-shadowing effect in the course of formation, with a porous columnar (or prismatic) texture comprising substantially uniform micropores having an average pore size of about 5–2,000 Å. In the case where the average pore size is smaller than 5 Å, the gas-permeation rate is so low that practicability will be demolished, while when larger than 2,000 Å, the gas-separability will be too much deteriorated, so that conditions for the vapor deposition are to be controlled so that the average pore size may fall in the range between about 5 Å and about 2,000 Å. A preferable thickness of the vapor-deposited membrane is in the range between about 10 Å and about 100μ, and as a material therefor, can be used not only oxides, carbides and nitrides but also metals and inter-metallic compounds.

After membrane 9 has been thus deposited, by means of a gaseous phase method, on the surface of phase-separable glassy membrane 4, glassy membrane 4 is subjected, by heating, to a glassy-phase-separation treatment as described hereinabove, whereby the glassy phase in glassy membrane 4, is separated into a silica-rich glassy phase 5 and a alkali-rich glassy phase 6, as shown in FIG. 7.

The glassy phase-separated membrane is then subjected to an elution treatment under the same conditions as described hereinabove, to elute the alkali-rich glassy phase 6, whereby as having vapor-deposited membrane 9 remaining on the surface, forming the silica-rich glassy porous membrane 8 having substantially reticular micropores 7 with an average pore size of 10–5,000 Å, as shown in FIG. 8.

Further, in another embodiment of the process of the invention, firstly, upon a glassy-phase-separation treatment, glassy membrane 4 is separated into a silica-rich glassy phase 5 and a alkali-rich glassy phase 6 as described with respect to FIG. 3 hereinabove. Secondly, on the surface of phase-separated glassy membrane 4, metallic or ceramic membrane 9 is formed by gaseous phase method, as shown in FIG. 7. Finally, the thus formed two-layered membrane is subjected to an elution treatment to elute alkali-rich glassy phase 6, whereby is produced silica-rich glassy porous membrane 8 having substantially reticular micropores 7 and having vapor-deposited membrane 9 covering the surface thereof, as shown in FIG. 8.

In a different embodiment of the process of the invention, firstly, glassy membrane 4 is subjected to a glassy-phase-separation treatment to separate into silica-rich glassy phase 5 and alkali-rich glassy phase 6 as shown in FIG. 3, and secondly, subjected to an elution treatment as mentioned hereinabove, to elute alkali-rich glassy phase 5, thereby forming porous glassy membrane 8 having substantially reticular micropores 9 with an average pore size of about 10–5,000 Å, as shown in FIG. 4. Finally, on the surface of porous glassy membrane 8 thus obtained, metallic or ceramic membrane 9 is deposited by gaseous phase method.

Thus, in the process of the present invention, membrane 9 is deposited, by a gaseous phase method, on the surface of porous membrane 8 of a physically and chemically stable, silica-rich glass which consists substantially of $SiO_2$, having its alkali-rich glassy phase eluted, so that membrane 9 may grow into a uniform and stable form and accordingly, bonding strength with silica-rich glassy porous membrane 8 can be increased. Besides, in the case where a CVD method is adopted among gaseous phase methods, reactive gas can be diffused inside reticular micropores 7 of glassy porous membrane 8 and, therefore, it has an advantage that the thickness of vapor-deposited membrane 9 can be augmented.

In a further different embodiment of the invention, as shown in FIG. 9, it is preferred that support 1 of ceramic porous body comprises, internal layer 10 having a relatively large grain size and surface layer 11 small in grain size, pore size and surface roughness, and also preferred that the support is subjected to a surface treatment to smooth its surface up to a surface roughness of less than $1\mu$. Any of the following methods can be used as a surface treatment method: coating with fine ceramic particles; glazing; grinding; and the like. On the surface of support 1 having a surface roughness of $30\mu$ or less, preferably $1\mu$ or less, metallic or ceramic membrane 9 may be directly deposited by gaseous phase method as described hereinbefore, to form a separation membrane which is also an embodiment of the present invention.

A separation membrane thus produced according to the present invention fundamentally comprises glassy porous membrane 8 having substantially reticular micropores with an average pore size of about 10 Å to about 5,000 Å, obtained by a glassy-phase-separation treatment, which glassy porous membrane being fixed on the surface of porous support 1 having an excellent mechanical strength, so that it is possible to reduce sufficiently the thickness of porous membrane 8 to about 10–500$\mu$ and, furthermore, as a result of the glassy-phase-separation treatment of phase-separable glass, followed by the elution treatment, glassy porous membrane 8 having substantially reticular micropores 7 with a uniform pore size of 10–5,000 Å can be produced without forming any cracks.

Further, in the process of the invention where the metallic or ceramic membrane 9 is deposited on the surface of phase-separable glassy membrane 4 which is suitable for depositing membrane thereupon by a gaseous phase method and possesses an appreciable strength, vapor deposited membrane 9 having uniform, fine micropores with an average pore size of about 5 Å to about 2,000 Å, can be produced with high stability. In addition, in the case where glassy membrane 4 is subjected to a glassy-phase-separation treatment followed by an elution treatment after membrane 9 has been vapor-deposited thereupon, only glassy membrane 4 can be transformed to a silica-rich glassy porous membrane 8 having substantially reticular micropores 7 with an average pore size of about 10–5,000 Å and exhibiting a high gas-permeability, as provided with vapor-deposited membrane 9 remaining on the surface. Accordingly, a separation membrane comprising glassy porous membrane 8 having a high gas-permeability and metallic or ceramic membrane 9 having uniform and fine micropores, deposited on the surface of the glassy porous membrane, can be manufactured with high stability and, further, by properly controlling conditions for membrane-formation by gaseous phase method and/or for phase-separation of glassy phase 4, a separation membrane having any desired average pore size and thickness can be manufactured.

The separation membrane according to the present invention, when used for gas-separation, will be able to efficiently proceed the gas-separating operation. Besides, glassy porous membrane 8 is far more excellent in heat resistance, corrosion resistance and durability than conventional membranes comprising an organic high polymer, and so its practicability is very high.

The separation membrane according to the present invention is, since comprising glass, ceramic and/or metal, different from conventional organic high polymer membranes, wherein it is very excellent in heat resistance, corrosion resistance and durability, and also free from any cracks such as observed in a conventional multilayered porous body which is obtained by impregnating a ceramic sintered body with aluminum alcholate, etc., hydrolyzing, thereafter drying followed by firing, so that the former is quite suitable for a high efficient gas-separation.

The invention will be explained in more detail hereinafter with reference to examples. The "percent" used in the examples means "weight percent", unless otherwise specifically indicated.

EXAMPLE 1

Glass-forming raw materials with a composition of 70% $SiO_2$, 25% $B_2O_3$ and 5% $Na_2O$ were mixed, melted at 1,400° C. and put into water to quench. After crushing, the resultant was wet pulverized in a ball mill to prepare a slip. The slip was applied, forming a precursor layer about $50\mu$ thick, on a surface of alumina support 1 mm thick having continuous micropores with an average pore size of about $1\mu$. It was heated at 1,400° C. to melt the precursor layer and then subjected to a glassy-phase-separation treatment at 500° C. for 1 hr. After gradually cooling, alkali-rich glassy phase was eluted at 80° C. with 0.1N-hydrochloric acid. The elution-treated body was washed with water and dried. As a result, a glassy porous membrane having substantially reticular micropores with an average pore size of about 50 Å was formed on the surface of the support.

Herein, for measuring the pore size, a well-known mercury porosimeter was adopted. In all the following examples, the measurement of pore size was carried out by the same method as the above.

EXAMPLE 2

Glass-forming raw materials with a composition of 65% $SiO_2$, 30% $B_2O_3$ and 5% $Na_2O$ were mixed, and slip was prepared thereform in the same manner as Example 1. This slip was applied, forming precursor layers about 100μ thick, on both surfaces of a mullite porous cylindrical support having a wall thickness of 1 mm, an outside diameter of 5 mm and an average pore size of about 15μ. After heating at 1,400° C., it was subjected to a glassy-phase-separation treatment at 650° C. for 48 hours. Then after gradually cooling, the alkali-rich glassy phase was eluted with hot water at 90° C. and washed, followed by drying, to form a glassy porous membrane having substantially reticular micropores with an average pore size of about 150 Å, on both surfaces of the cylindrical support.

As a comparative example, other than the separation membranes fixed on the ceramic support obtained in Examples 1 and 2, an independent glassy porous membrane was prepared as follows.

The same phase-separable glass as used in Example 2 was formed into a thin plate 1 mm thick which was then melted at 1,400° C. and subjected to a glassy-phase-separation treatment at 500° C. for 1 hour, followed by an elution treatment with 0.1N-hydrochloric acid at 80° C. The resultant was washed and dried to obtain a glassy porous membrane having an average pore size of 50 Å.

Five test-pieces were prepared from the separation membranes obtained respectively in the foregoing Examples 1 and 2 and this comparative example, and from the alumina flat plate and mullite cylinder used as the support in Examples 1 and 2 respectively, and were tested for separation of mixed gas consisting of 50 vol. % $H_2$ and 50 vol. % $N_2$, using a flow type gas-separation apparatus. From the test carried out under conditions of: an inlet pressure of 5.0 kg/cm$^2$; an outlet pressure of 1 kg/cm$^2$; and a temperature of 300° C., the result give in Table 1 was obtained.

TABLE 1

| Example No. | $H_2$ Concentration (Vol. %) Inlet | $H_2$ Concentration (Vol. %) Outlet | Gas-permeation Rate (Index) |
|---|---|---|---|
| Example 1 | 50 | 67 | 1,800 |
| Example 2 | " | 65 | 500 |
| Comparative | " | 65 | 100 |
| Alumina-plate | " | 50 | — |
| Mullite-cylinder | " | 50 | — |

EXAMPLE 3

Slip of a phase-separable $Na_2O$—$B_2O_3$—$SiO_2$ system glass was applied, forming a precursor layer about 100μ thick, on a flat plate 1 mm thick of a ceramic porous body having an average pore size of about 15μ, produced by firing mullite particles. After melting the precursor layer by heating, the plate was treated in a reaction tube by a gaseous phase CVD method, to deposit on the phase-separable glassy membrane, an $Al_2O_3$ membrane 10μ thick having micropores with an average pore size of about 100 Å. In the CVD method, raw material gases were $AlCl_3$ and $H_2O$; carrier gases, Ar and $O_2$; and the reaction temperature, 900° C. Thereafter, a glassy-phase-separation treatment was carried out at 500° C. for 12 hours, followed by an elution treatment with 0.1N-hydrochloric acid at 90° C., to transform the glassy membrane into a silica-rich glassy porous membrane having substantially reticular miropores with an average pore size of about 2,000 Å. As the result, a separation membrane was obtained comprising a membrane 10μ thick vapor-deposited, by gaseous phase method, on the surface of the glassy porous membrane.

EXAMPLE 4

Slip of a phase separable $Na_2O$—$B_2O_3$—$SiO_2$ system glass was applied, forming a precursor layer about 100μ thick, on a flat plate 1 mm thick of a ceramic porous body having an average pore size of about 1μ, produced by firing alumina particles. After melting the precursor layer by heating, the plate was treated in a reaction tube by a vacuum evaporation method, to form on the phase-separable glassy membrane, an $Al_2O_3$ membrane 2μ thick having micropores with an average pore size of about 50 Å. In the vacuum evaporation method, the vaporization material was Al; the ambient gas, $O_2$; the surrounding gas pressure, $10^{-5}$ torr.; and the temperature of phase-separable glassy membrane was maintained at 400° C. Under these conditions, the glassy phase-separation proceeded concurrently with the formation of a $Al_2O_3$ membrane. After cooling, an elution treatment with 0.1N-hydrochloric acid at 90° C. was carried out, to transform the glassy membrane into a silica-glassy porous membrane having substantially reticular micropores with an average pore size of about 1,000 Å. As the result, a separation membrane was obtained comprising a membrane 2μ thick vapor-deposited, by gaseous phase method, on the surface of the glassy porous membrane.

EXAMPLE 5

Slip of a phase-separable $Na_2O$—$B_2O_3$—$SiO_2$ system glass was applied, forming a precursor layer about 300μ thick, on a flat plate 1 mm thick of a ceramic porous body having an average pore size of about 1μ, produced by firing alumina particles. After melting the precursor layer by heating, the plate was treated in a reaction tube by a sputtering method, to deposit on the phase-separable glassy membrane, an AlN membrane 0.1μ thick having micropores with an average pore size of about 100 Å. In the sputtering method, the electric discharge was effected under conditions of: Al used as the cathode; atmospheres, Ar of $5 \times 10^{-3}$ torr. and $N_2$ of $2 \times 10^{-3}$ torr.; and a flat plate temperature of 200° C. Thereafter, a glassy-phase-separation treatment was effected at 500° C. for 12 hours, and then after cooling, an elution treatment with 0.1N-hydrochloric acid at 90° C. was carried out, to transform the glassy membrane on the alumina porous body into a porous membrane having substantially reticular micropores with an average pore size of about 2,000 Å. As the result, a separation membrane was obtained comprising a membrane 0.1μ thick vapor-deposited, by gaseous phase method, on the surface of the glassy porous membrane.

As a comparative example, other than the separation membranes described in the foregoing Examples 3–5, a separation membrane 1 mm thick having an average pore size of about 50 Å and consisting of glass alone, was prepared by a glassy-phase-separation treatment of a glass.

These membranes were tested for separation of mixed gas consisting of 50 vol. % $H_2$ and 50 vol. % $N_2$, using a flow type gas-separation apparatus. From the test carried out under conditions of: an inlet pressure of 5.0 kg/cm$^2$; an outlet pressure of 1 kg/cm$^2$; and a temperature of 300° C., the result given in the following Table 2 was obtained.

TABLE 2

| Example No. | H$_2$ Concentration (Vol. %) | | Gas-permeation Rate (Index) |
|---|---|---|---|
| | Inlet | Outlet | |
| 3 | 50 | 67 | 8,000 |
| 4 | " | 65 | 20,000 |
| 5 | " | 67 | 10,000 |
| Comparative | " | 65 | 100 |

EXAMPLE 6

Slip of a phase-separable Na$_2$O—B$_2$O$_3$—SiO$_2$ system glass was applied, forming a precursor layer about 100μ thick, on a flat plate 1 mm thick of a ceramic porous body having an average pore size of about 15μ, produced by firing mullite particles. After melting the precursor layer by heating, a glassy-phase-separation treatment was effected at 500° C. for 12 hours. On the thus phase-separated glassy membrane, was deposited by a gaseous phase CVD method carried out in a reaction tube, an Al$_2$O$_3$ membrane 10μ thick comprising micropores having an average pore size of 200 Å. In the CVD method, as raw material gases, AlCl$_3$ and H$_2$O were used; as carrier gases, Ar and O$_2$; and the reaction temperature was 900° C. Thereafter, an elution treatment was effected with 0.1N-hydrochloric acid at 90° C., to transform the phase-separated glassy membrane into a silica-rich glassy porous membrane having substantially reticular micropores with an average pore size of 2,000 Å. As the result, a separation membrane was obtained comprising a membrane 10μ thick vapor-deposited by gaseous phase method, on the surface of the glassy porous membrane.

EXAMPLE 7

Slip of a phase-separable Na$_2$O—B$_2$O$_3$—SiO$_2$ system glass was applied, forming a precursor layer about 100μ thick, on a flat plate 1 mm thick of a ceramic porous body having an average pore size of about 1μ, produced by firing alumina particles. After melting the precursor layer by heating, a glassy-phase-separation treatment was effected at 400° C. for 10 hours. On the thus phase-separated glassy membrane, was deposited by a vacuum evaporation method carried out in a reaction tube, an Al$_2$O$_3$ membrane 2μ thick comprising micropores having an average pore size of about 50 Å. In the vacuum evaporation method, the vaporization material was Al; the ambient gas, O$_2$; the gas pressure, 10$^{-5}$ torr; and the temperature of phase-separated glassy membrane was maintained at 400° C. After cooling, an elution treatment with 0.1N-hydrochloric acid at 90° C. was carried out, to transform the glassy membrane into a silica-glassy porous membrane having substantially reticular micropores with an average pore size of about 1,000 Å. As the result, a separation membrane was obtained comprising a membrane 2μ thick vapor-deposited, by gaseous phase method, on the surface of the glassy porous membrane.

EXAMPLE 8

Slip of a phase-separable Na$_2$O—B$_2$O$_3$—SiO$_2$ system glass was applied, forming a precursor layer about 300μ thick, on a flat plate 1 mm thick of a ceramic porous body having an average pore size of about 1μ, produced by firing alumina particles. After melting the precursor layer by heating, a glassy-phase-separation treatment was effected at 500° C. for 12 hours. On the thus phase-separated glassy membrane, was deposited by a sputtering method carried out in a reaction tube, an AlN membrane 0.1μ thick having micropores with an average pore size of about 100 Å. In the sputtering method, the electric discharge was effected under conditions of: Al used as the cathode; atmosphere, Ar of 5×10$^{-3}$ torr. and N$_2$ of 2×10$^{-3}$ torr.; and a flat plate temperature of 200° C. After cooling, an elution treatment with 0.1N-hydrochloric acid at 90° C. was carried out, to transform the glassy membrane on the alumina porous body into a glassy porous membrane having substantially reticular micropores with an average pore size of about 2,000 Å. As the result, a separation membrane was obtained comprising a membrane 0.1μ thick vapor-deposited, by gaseous phase method, on the surface of the glassy porous membrane covering the alumina porous body.

As a comparative example, other than the separation membranes obtained in the foregoing Examples 6-8, a separation membrane 1 mm thick having an average pore size of about 50 Å and consisting of glass alone, was prepared by a glassy-phase-separation treatment of a glass.

These membranes were tested for separation of mixed gas consisting of 50 vol. % H$_2$ and 50 vol. % N$_2$, using a flow type gas-separation apparatus. From the test carried out under conditions of: an inlet pressure of 5.0 kg/cm$^2$; an outlet pressure of 1 kg/cm$^2$; and a temperature of 300° C. the result given in Table 3 was obtained.

TABLE 3

| Example No. | H$_2$ Concentration (Vol. %) | | Gas-permeation Rate (Index) |
|---|---|---|---|
| | Inlet | Outlet | |
| 6 | 50 | 67 | 8,000 |
| 7 | " | 65 | 20,000 |
| 8 | " | 67 | 10,000 |
| Comparative | " | 65 | 100 |

EXAMPLE 9

Slip of a phase-separable Na$_2$O—B$_2$O$_3$—SiO$_2$ system glass was applied, forming a precursor layer about 100μ thick, on a flat plate 1 mm thick of a ceramic porous body having an average pore size of about 15μ, produced by firing mullite particles. After melting the precursor layer by heating, a glassy-phase-separation treatment was effected at 500° C. for 12 hours. Then, an elution treatment with 0.1N-hydrochloric acid at 90° C. was carried out, to transform the phase-separated glassy membrane into a porous membrane having substantially reticular micropores with an average pore size of about 2,000 Å. On the surface of thus formed porous membrane, was deposited by a gaseous phase CVD method carried out in a reaction tube, an Al$_2$O$_3$ membrane 10μ thick having micropores with an average pore size of 200 Å. In the CVD method, as raw material gases, AlCl$_3$ and H$_2$O were used; as carrier gases, Ar and O$_2$; and the reaction temperature was 900° C. As the result, a separation membrane was obtained comprising a membrane 10μ thick vapor-deposited, by gaseous phase method, on the surface of the glassy porous membrane.

EXAMPLE 10

Slip of a phase-separable $Na_2O$—$B_2O_3$—$SiO_2$ system glass was applied, forming a precursor layer about 100μ thick, on a flat plate 1 mm thick of a ceramic porous body having an average pore size of about 1μ, produced by firing alumina particles. After melting the precursor layer by heating, a glassy-phase-separation treatment was effected at 400° C. for 10 hours. Then, an elution treatment with 0.1N-hydrochloric acid at 90° C. was carried out, to transform the phase-separated glassy membrane into a glassy porous membrane having substantially reticular micropores with an average pore size of about 1,000 Å. On the thus treated glassy porous membrane, was deposited by a vacuum evaporation method carried out in a reaction tube, an $Al_2O_3$ membrane 2μ thick having micropores with an average pore size of about 50 Å. In the vacuum evaporation method, the vaporization material was Al; the ambient gas, $O_2$; the gas pressure, $10^{-5}$ torr.; and the temperature of glassy porous membrane was maintained at 400° C. As the result, a separation membrane was obtained comprising a membrane 2μ thick vapor-deposited, by gaseous phase method, on the surface of the glassy porous membrane.

EXAMPLE 11

Slip of a phase-separable $Na_2O$—$B_2O_3$—$SiO_2$ system glass was applied, forming a precursor layer about 300μ thick, on a flat plate 1 mm thick of a ceramic porous body having an average pore size of about 1μ, produced by firing alumina particles. After melting the precursor layer by heating, a glassy-phase-separation treatment was effected at 500° C. for 12 hours. Then, an elution treatment with 0.1N-hydrochloric acid at 90° C. was carried out, to transform the phase-separated glassy membrane into a porous membrane having substantially reticular micropores with an average pore size of about 2,000 Å. Thereafter, on the surface of thus formed porous membrane, was deposited by a sputtering method carried out in a reaction tube, an AlN membrane 0.1μ thick having micropores with an average pore size of about 100 Å. In the sputtering method, the electric discharge was effected under conditions of: Al used as the cathode; atmospheres, Ar of $5 \times 10^{-3}$ torr. and $N_2$ of $2 \times 10^{-3}$ torr; and a flat plate temperature of 200° C. As the result, a separation membrane was obtained comprising a membrane 0.1μ thick vapor-deposited, by gaseous phase method, on the surface of glassy porous membrane covering the alumina porous body.

As a comparative example, other than the separation membranes obtained in the foregoing Examples 9-11, a separation membrane 1 mm thick having an average pore size of about 50 Å and consisting of glass alone, was prepared by a glassy-phase-separation treatment of a glass.

These membranes were tested for separation of mixed gas consisting of 50 vol. % $H_2$ and 50 vol. % $N_2$, using a flow type gas-separation apparatus. From the test carried out under conditions of: an inlet pressure of 5.0 kg/cm²; an outlet pressure of 1 kg/cm²; and a temperature of 300° C., the result given in Table 4 was obtained.

TABLE 4

| Example No. | $H_2$ Concentration (Vol. %) Inlet | $H_2$ Concentration (Vol. %) Outlet | Gas-permeation Rate (Index) |
| --- | --- | --- | --- |
| 9 | 50 | 66 | 10,000 |
| 10 | " | 65 | 26,000 |
| 11 | " | 66 | 12,000 |
| Comparative | " | 65 | 100 |

As is apparent from the above explanation, the separation membrane according to the present invention which comprises a membrane having micropores and being suitable for gas-separation and a porous body having a high gas-permeability, can be obtained with a high stability, by a process comprising: fixing, on the surface of a porous support having substantially continuous micropores, at least a glassy porous membrane of appreciable strength having a smooth surface and micropores with an average pore size of about 10–5,000 Å formed by a glassy-phase-separation treatment; or vapor-depositing on the surface of a glassy membrane, by a gaseous phase method, a membrane having uniform micropores with an average pore size of about 5–2,000 Å and thereafter subjecting the membranes to a glassy-phase-separation treatment, followed by an elution treatment, to transform the glassy membrane into a porous body having a high gas-permeability, remaining the vapor-deposited membrane thereupon. The separation membrane according to the invention is excellent in uniformity of micropores, heat resistance, corrosion resistance, durability and mechanical strength, and particularly as shown in the drawing, those comprising a glassy membrane covering the surface of a porous support exhibit a superior strength for practical use. Further, the separation membrane of the present invention not only can be manufactured with any desired thickness and pore size, but also without any cracks, so that it is particularly suitable for performing gas-separation with high efficiency.

Thus, the separation membrane according to the present invention is advantageously applicable in diversified fields of: recovery of $H_2$ from by-product gases in iron mills; mixing ratio adjustment of synthetic gases, CO—$H_2$ gas, etc. in $C_1$-chemistry; and gas-separation such as in concentration of He from natural gases and the like. Other than the above, the separation membrane of the invention also can be utilized effectively in the fields of: microfiltration such as filtration of aqueous solutions, organic solvents, yeasts, moulds, bacteria, virus and the like; ultrafiltration such as in concentration, recovery and purification of proteins, and biogenic materials, e.g. vaccine, enzyme, virus, nucleic acid, etc.; and, in addition, reverse osmotic filtration such as in desalnization of sea water and brine, manufacture of pure water and sterile water; etc.

Accordingly, it is believed that the present invention will, sweeping away problems of conventional separation membranes of this kind, contribute largely to the future development of industries.

While there has been shown and described what are considered the preferred embodiments of the invention, it will be obvious to those skilled in the art that various alternations and modifications may be made therein without departing from the scope of the invention as defined by the appended claims.

What is claimed is:

1. A separation membrane comprising:

a glassy porous membrane having substantially reticular micropores therein, said substantially reticular micropores having an average pore size of about 10-5,000 Å obtained by a glassy-phase-separation of a glassy membrane; and a porous support having substantially continuous micropores therein, said glassy porous membrane being fixed on a surface of said porous support.

2. A separation membrane as claimed in claim 1, further comprising a vapor deposited membrane selected from the group consisting of metallic and ceramic membranes, said vapor deposited membrane having micropores with an average pore size of about 5-2,000 Å, said vapor deposited membrane being located on a surface of said glassy porous membrane which is remote from said porous support.

3. A separation membrane as claimed in claim 1, wherein the porous support comprises a porous body having substantially continuous micropores with an average pore size of about 0.5-30μ, said porous body comprising a material selected from the group consisting of ceramics and glasses.

4. A separation membrane as claimed in claim 1, wherein the glassy porous membrane is about 10-500μ thick.

5. A separation membrane as claimed in claim 2, wherein the vapor-deposited metallic or ceramic membrane is about 10 Å to about 100μ thick.

6. A process for manufacturing a separation membrane comprising at least the following sequential steps: covering a surface of a porous support with a precursor layer for a porous membrane, said porous support having substantially continuous micropores and said precursor layer comprising phase-separable glass particles; heating the precursor layer to transform the glass particles into a glassy membrane on said surface of the support; subjecting the glassy membrane to a further heat-treatment to separate a glassy phase of the glassy membrane into a silica-rich glassy phase and an alkali-rich glassy phase; and eluting the alkali-rich glassy phase from the glassy membrane with a solvent for the alkali-rich glassy phase, thereby transforming the phase-separated glassy membrane into a glassy porous membrane having substantially reticular micropores with an average pore size of about 10-5,000 Å.

7. A process as claimed in claim 6, wherein the precursor layer is about 10-500 μm thick.

8. A process as claimed in claim 6, wherein said further heat treatment is effected at a temperature of 150°-800° C.

9. A process as claimed in claim 6, further comprising a step of vapor-depositing a membrane by a gaseous phase method, on a surface of the glassy membrane remote from said porous support layer, said vapor deposited membrane comprising a material selected from the group consisting of metallic materials and ceramic materials, said vapor deposited membrane having micropores with an average pore size of about 5-2,000 Å, said vapor depositing occuring after the precursor layer heating step and before said further heat-treatment step.

10. A process as claimed in claim 6, further comprising a step of vapor-depositing a membrane by a gaseous phase method, on a surface of the glassy membrane remote from said porous support layer, said vapor deposited membrane comprising a material selected from the group consisting of metallic materials and ceramic materials, said vapor deposited membrane having micropores with an average pore size of about 5-2,000 Å, said vapor depositing occuring after said further heat-treatment step and before said eluting step.

11. A process as claimed in claim 6, further comprising a step of vapor-depositing a membrane by a gaseous phase method, on a surface of the glassy membrane remote from said porous support layer, said vapor deposited membrane comprising a material selected from the group consisting of metallic materials and ceramic materials, said vapor deposited membrane having micropores with an average pore size of about 5-2,000 Å, said vapor depositing occuring after said eluting step.

12. A process as claimed in claim 6, wherein the vapor-deposited membrane is about 10 Å-about 100μ thick.

13. A process as claimed in claim 6, wherein the solvent for the alkali-rich glassy phase is selected from the group consisting of hot water and acids.

14. A process as claimed in claim 6, wherein said eluting step is effected with 0.01-0.1 N-hydrochloric acid at a temperature of 60°-100° C.

* * * * *